Patented July 29, 1947

2,424,923

UNITED STATES PATENT OFFICE 2,424,923

FIBROUS LAMINATE AND PROCESS OF MAKING SAME

Kenneth L. Edgar, Cuyahoga Falls, and Frederick W. Stavely, Akron, Ohio, and Charles K. Novotny, Des Moines, Iowa, assignors to The Firestone Tire & Rubber Company, Akron, Ohio, a corporation of Ohio No Drawing. Application January 12, 1946, Serial No. 641,004

6 Claims. (Cl. 154—140)

This invention relates to fiber-reinforced laminated plastic structures, and to a process of making the same.

Laminates made from textile and like materials impregnated with urea-formaldehyde resins have entered into extensive use for the fabrication of rigid articles such as electrical panels, table tops and the like. The materials involved are cheap, and lend themselves to fabrication processes, due to the relatively low curing temperature of the urea-formaldehyde resin. Unfortunately, however, these laminates have been found too brittle and inflexible for any save the most limited applications.

Accordingly, it is an object of this invention to improve the properties, particularly the flexibility and shock resistance, of urea-formaldehyde fabric laminates.

Another object is to provide such laminates into which a proportion of a rubbery butadiene-styrene copolymer (hereinafter such copolymers will be designated "Buna S") is compounded, for the purpose of improving the flexibility and shock resistance thereof.

A further object is to provide a process for impregnating fabrics for lamination with compositions comprising urea-formaldehyde resins and Buna S, and to overcome certain difficulties in such operations more particularly detailed hereinafter.

The present invention, as above noted, is based upon the discovery that the incorporation of from about 10 per cent to about 40 per cent of Buna S with an urea-formaldehyde resin to be used as impregnating fabric for lamination, greatly enhances the flexibility and shock resistance of the resultant laminates. This is rather surprising in view of the vastly dissimilar natures of the urea resin and Buna S which, prospectively at least, might be expected to yield incompatible masses having no practical utility whatsoever. Contrary to this expectation, the laminated materials of this invention have excellent strength and shock resistance, and have met with considerable success for many purposes such, for instance, as supporting panels for aircraft fuel cells, in which applications the materials have exhibited great resistance to shattering by gunfire and crash impact. The laminated materials of this invention are likewise adapted, by reason of their excellent mechanical properties, for many other uses such as luggage panels, construction materials and the like.

Referring to the urea-formaldehyde resin forming one constituent of the materials of this invention, this may be any of the condensates of urea and formaldehyde, usually reaching the market as a water dispersible, incompletely condensed material. Such urea resins may have condensed therewith minor proportions of modifying agents such as alcohols, fatty materials and the like. The resins usually contain, or require the addition of, small amounts of substances capable of evolving acids to effect the cure of the resin in the final laminate. These curing agents, as will appear more fully hereinbelow, introduce difficulties into the compounding and application of the compositions of this invention, and it is toward the solution of these difficulties that some of the more specific aspects of this invention are concerned.

Referring next to the Buna S forming the second main constituent of the laminating agents of this invention, this may be any copolymer of butadiene with from about 10 to 40 per cent of styrene, based on the total weight of butadiene and styrene. This material should preferably be in the form of an aqueous emulsion, or "latex," since the urea-formaldehyde resin is water dispersible, and the two materials may therefore be most readily compounded and applied in the form of their aqueous dispersions. The latex should preferably contain stabilizing agents such as ammonia or the like to prevent coagulation thereof when blended with the urea-formaldehyde resin solution.

The compositions of this invention are preferably applied in the form of a mixed aqueous dispersion of urea-formaldehyde resin and Buna S to the fabric, sheet, cord or other material to be used in the laminate. Such dispersions may be made by mixing together an aqueous solution of the urea-formaldehyde resin and a latex of the Buna S. A slight complication enters at this point, due to the tendency of the two materials to prematurely gel, particularly if the acid hardening agent, necessary for the cure of the urea-formaldehyde resin, is present. This difficulty may be overcome, at least in part, by the addition of alkaline stabilizing agents to the latex, and by the use of curing agents which develop acidity only after some delay.

Even under optimum conditions, however, the aqueous dispersions containing urea-formaldehyde resins, Buna S and curing agents tend to set up rather quickly. To partially obviate this difficulty, the compositions of this invention may be applied to the fabric (or other fibrous material to be laminated) in several separate coatings, only few of which contain any curing agent. The Buna S copolymer latex may be, and preferably is, omitted from those coatings which contain hardening agents, i. e., these coatings will be simple urea resin dispersions containing acid curing agents. It has been found that, under curing conditions, the curing agent will migrate through as many as three or four coatings of the material to provide adequate curing for all coatings. Likewise, in the preferred case where the Buna S copolymer is omitted from the layers containing the hardening agent, the other layers interpenetrate the copolymer-free sufficiently to provide the proper flexibility and shock resistance in the final cured product. In this way, elaborate precautions and haste in application need be exercised only with respect to those coatings containing the curing agent, effecting a substantial reduction in time and wastage of material.

The impregnating compositions of this invention may contain, in addition to the materials referred to above, other ingredients such as pigments, reinforcing agents, special curing and vulcanizing agents for effecting the cure of the Buna S copolymer, and the like.

The compositions of this invention may be used for laminating a wide variety of web materials, such as woven fabrics, cord plies, and the like, embodying various types of fiber, such as cotton, viscose rayon, nylon, glass filament and the like; also for laminating unwoven web materials such as paper, felt, fiber bats and the like. The web material is given several coatings of the mixed aqueous dispersion of urea resin and Buna S latex, the web being dried between successive coatings. A few of these coatings will contain curing agents for the urea resin, the arrangement being such that no single coating is separated, from a coating containing curing agent, by more than two or three layers of composition. The impregnated fabric, which is sufficiently flexible and tacky for this purpose, is then plied up and built into the shape of the desired laminated article, and the assembly cured. The cure may be at temperatures ranging from about 180° to about 250° F. preferably, but not necessarily, with application of mechanical or hydraulic pressure to insure cohesion of the plies.

By reason of their improved flexibility and shock resistance, the laminated products of this invention may be used for a wide range of applications, for instance as supporting panels for elastomer composition aircraft fuel cells and as integral reinforcing plies in such fuel cells; in these applications, the laminates of this invention, besides their considerable strength and shock resistance, have the unique advantage that any damage which may be inflicted thereon, as by gunfire or crash injury, tends to be localized in the immediate area of penetration, rather than to take the form of tearing or shattering over a wide area. The materials may likewise be used for many other purposes, such as luggage, airframe components, prefabricated building subassemblies, furniture and components thereof, electrical and radio housings and the like.

With the foregoing general discussion in mind, there are given herewith detailed examples of the practice of this invention. All parts given are by weight.

EXAMPLE I

A

| | Parts |
|---|---|
| Uncured urea-formaldehyde resin | 100 |
| Water | 25 |
| Tetraethanol ammonium hydroxide (20% aqueous solution) | 1.25 |

B

| | Parts |
|---|---|
| Buna S latex [1] | 70, 100, 130, 165 or 270 |
| Ammonia (7.5% aqueous solution) | 1.33 |

[1] A latex containing 15% of a copolymer of 75% butadiene and 25% styrene.

C

| | Parts |
|---|---|
| Acid reacting hardener for the urea-formaldehyde resin | 18 |

A series of impregnating compositions were made up, using the Buna S latex in the various amounts listed. In each case, the uncured urea-formaldehyde resin and water were mixed, yielding a smooth emulsion, to which the tetraethanol ammonium hydroxide was then added. The Buna S latex and ammonia were then mixed and the aforesaid emulsion was added to this latex mixture, and thoroughly stirred in. Finally, just before use, the acid reacting hardener was added.

The composition was then brush coated onto a heavy cotton duck weighing about 20 ounces per square yard, so as to leave, when dry, about 10 ounces of composition per square yard of fabric. The fabric was then plied up into a laminate of six layers, and cured in a press for 25 minutes at 250° F.

All of the laminates prepared as above described had excellent strength and shock resistance, and withstood a standard gunfire test without shattering. The most desirable properties were exhibited by the three specimens made from compositions containing 100, 130 and 165 parts of Buna S latex, i. e., compositions containing, on the dry basis, 15–25 parts of butadiene-styrene copolymer per 100 parts of urea resin.

EXAMPLE II

*Composition E*

Same as the laminating composition of Example I, using 130 parts of Buna S latex with omssion of the acid reacting hardener.

*Composition F*

| | | Parts |
|---|---|---|
| G | Uncured urea-formaldehyde resin | 80 |
| | Water | 20 |
| H | Acid reacting hardener | 15 |
| | Water | 15 |

Separate solutions were made up from the ingredients listed at G and H, solution H being added to solution G immediately before use.

*Coating procedure*

Several coats of the above materials were applied by means of a knife coating machine to a cotton duck fabric having a weight of 20 ounces per square yard, the fabric being dried between successive passes. The coats were applied according to the following schedule:

TABLE I

| Pass No. | 1 | 2 | 3 | 4 | 5 | 6 |
|---|---|---|---|---|---|---|
| Composition, Type | E | E | F | F | E | E |
| Applied Weight, oz. per sq. yd. | 2 | 2 | 1 | 1 | 1 | 1 |
| Side of fabric to which applied | ¹T | ²B | T | B | T | B |

¹ T, top.   ² B, back.

*Laminating procedure*

Layers of the coated fabric were plied up into a laminate of 3 plies, and cured in a press at 250° F. for 20 minutes. The cured laminate had excellent strength and shock resistance, notwithstanding the omission of curing agent from coats 3 and 4 of the fabric.

A self sustaining, contoured elastomer composition aircraft fuel cell was fabricated, using 6 layers of the coated fabric as inside plies to provide integral stiffening. The fabric was sufficiently tacky (particularly when freshly spread, i. e. not over 2 or 3 days old, and when moistened with water), and sufficiently pliable, to facilitate the building operations. The fuel cell was cured in an open steam autoclave at 250° F. for 2 hours. The cured fuel cell was self-supporting when filled with fuel, and withstood gunfire tests very satisfactorily. A particularly advantageous feature of these cells was the localization of injuries caused by gunfire: the material was merely punctured or slightly torn at the points where the projectile penetrated the fuel cell, and did not shatter, "chunk out," or tear over a wide area as most other previous types of supporting materials do under such tests.

From the foregoing general discussion and detailed specific examples, it will be evident that this invention provides novel laminated materials having excellent strength, flexibility and shock resistance, and other desirable properties adapting them for many uses, such as aircraft fuel cell supporting panels, integral reinforcing plies in self supporting aircraft fuel cells, counter top and other furniture laminates, electrical and radio housings, radomes, and the like. The special techniques of this invention obviate many of the difficulties attendant upon the manufacture of the laminates of this invention, particularly the difficulty of handling the coating compositions. The uncured impregnated fabric has sufficient flexibility, drape and tack to facilitate building and plying operations.

What is claimed is:

1. An uncured fibrous lamina adapted for plying and curing to form a structural laminate, said lamina comprising a fibrous web impregnated and coated with a plurality of superposed coatings of binding material, certain of said coatings comprising a urea-formaldehyde resin and an elastomeric copolymer of butadiene and styrene free from curing agents for the urea-formaldehye resin, and others of said coatings comprising a urea-formaldehyde resin and a curing agent therefor, none of said coatings free from curing agents being separated by more than two coatings from a coating containing the curing agent.

2. An uncured fibrous lamina adapted for plying and curing to form a structural laminate, said lamina comprising a fibrous web impregnated and coated with a plurality of superposed coatings of binding material, certain of said coatings comprising a urea-formaldehyde resin and an elastomeric copolymer of butadiene and styrene free from curing agents for the urea-formaldehyde resin, and others of said coatings comprising a urea-formaldehyde resin and a curing agent therefor, and being free from the copolymer of butadiene and styrene.

3. Process which comprises coating and impregnating a textile fabric with a plurality of superposed coatings of binding material, certain of said coatings comprising a urea-formaldehyde resin and a copolymer of butadiene and styrene free from curing agents for the urea-formaldehyde resin, and others of said coatings comprising a urea-formaldehyde resin and a curing agent therefor, none of said coatings free from curing agents being spaced by more than two coatings from a coating containing a curing agent.

4. Process which comprises coating and impregnating a textile fabric with a plurality of superposed coatings of binding material, certain of said coatings comprising a urea-formaldehyde resin and a copolymer of butadiene and styrene free from curing agents for the urea-formaldehyde resin, and others of said coatings comprising a urea-formaldehyde resin and a curing agent therefor, and being free from the copolymer of butadiene and styrene, none of said coatings free from curing agents being spaced more than two coatings from a coating containing a curing agent.

5. Process which comprises coating and impregnating a textile fabric with a plurality of superposed coatings of binding material, certain of said coatings comprising a urea-formaldehyde resin and a copolymer of butadiene and styrene free from curing agents for the urea-formaldehyde resin, and others of said coatings comprising a urea-formaldehyde resin and a curing agent therefor, none of said coatings free from curing agents being spaced by more than two coatings from a coating containing curing agents, assembling plies of the coated web to form a laminate, and curing said laminate under heat and pressure.

6. Process which comprises coating and impregnating a textile fabric with a plurality of superposed coatings of binding material, certain of said coatings comprising a urea-formaldehyde resin and a copolymer of butadiene and styrene free from curing agents for the urea-formaldehyde resin, and others of said coatings comprising urea-formaldehyde resin and a curing agent therefor, and being free from the copolymer of butadiene and styrene, assembling plies of the coated fabric to form a laminate, and curing said laminate under heat and pressure.

KENNETH L. EDGAR.
FREDERICK W. STAVELY.
CHARLES K. NOVOTNY.

REFERENCES CITED

The following references are of record in the file of this patent:

UNITED STATES PATENTS

| Number | Name | Date |
|---|---|---|
| 2,211,945 | Charch | Aug. 20, 1940 |
| 1,776,879 | Baekeland | Sept. 30, 1930 |

Certificate of Correction

Patent No. 2,424,923.                                                                                      July 29, 1947.

KENNETH L. EDGAR ET AL.

It is hereby certified that error appears in the printed specification of the above numbered patent requiring correction as follows: Column 3, line 22, after "copolymer-free" insert *layer*; and that the said Letters Patent should be read with this correction therein that the same may conform to the record of the case in the Patent Office.

Signed and sealed this 30th day of December, A. D. 1947.

[SEAL]

THOMAS F. MURPHY,
*Assistant Commissioner of Patents.*